(12) United States Patent
Jalbert (10) Patent No.: US 12,220,290 B2
(45) Date of Patent: Feb. 11, 2025

(54) FLOSSING APPARATUS WITH QUICK RELEASE

(71) Applicant: Vincent Paul Jalbert, East Lyme, CT (US)

(72) Inventor: Vincent Paul Jalbert, East Lyme, CT (US)

( * ) Notice: Subject to any disclaimer, the term of this patent is extended or adjusted under 35 U.S.C. 154(b) by 331 days.

(21) Appl. No.: 17/872,186

(22) Filed: Jul. 25, 2022

(65) Prior Publication Data
US 2023/0301763 A1    Sep. 28, 2023

Related U.S. Application Data

(63) Continuation-in-part of application No. 17/703,477, filed on Mar. 24, 2022, now abandoned.

(51) Int. Cl.
*A61C 15/04*         (2006.01)

(52) U.S. Cl.
CPC ................... *A61C 15/046* (2013.01)

(58) Field of Classification Search
CPC ........ A61C 15/00; A61C 15/046; A61C 15/04
See application file for complete search history.

(56) References Cited

U.S. PATENT DOCUMENTS

| | | | | |
|---|---|---|---|---|
| 2,047,456 A * | 7/1936 | Barsch | ................ | A61C 15/046 |
| | | | | 132/325 |
| 2,059,287 A * | 11/1936 | Storm | ................ | A61C 15/046 |
| | | | | 132/323 |
| 6,155,274 A * | 12/2000 | Stein | .................... | A61C 15/046 |
| | | | | 132/327 |
| 2021/0052357 A1* | 2/2021 | Xu | ....................... | A61C 15/046 |

\* cited by examiner

*Primary Examiner* — Rachel R Steitz (57) ABSTRACT

A disposable dental flosser has a floss release feature that is operated with one hand. A movable section of a flosser provides a clamp that clamps one end of a length of floss. Deforming the movable section opens the clamp to release the end of the length of floss. The release of one end of the floss from the flossing device facilitates the easy removal of the floss from teeth.

3 Claims, 8 Drawing Sheets

FIG. 8

FLOSSING APPARATUS WITH QUICK RELEASE

TECHNICAL FIELD

The invention relates in general to dental instruments, and more specifically to structures for holding, dispensing, and manipulating dental floss.

BACKGROUND

Disposable dental flossers hold a short length of dental floss between two fixed points. These flossers enable people with or without physical limitations to floss their teeth and/or to floss more easily, and possibly more often, than they otherwise would.

Flossing involves the removal of trapped food particles from between the teeth and plaque from around the base of the teeth. Disposable dental flossers can be difficult to disengage from the interdental areas due to tightly spaced teeth or to unusual surface features of a tooth. With simple string floss, one could simply release an end of the floss and then pull the other end out laterally from between the teeth. This is not possible with currently available flossing devices.

SUMMARY

The present disclosure describes a one-handed floss disengagement apparatus as part of a disposable flossing device. A disposable apparatus for flossing teeth employs a length of dental floss that is connected to an anchor point and threaded through a sliding terminal and in turn about a wrapping channel, after which it is threaded through a release channel which resides beside an anchor wedge where the length of floss is held fast. The anchor wedge comprises a wedge-shaped opening between the body of the apparatus and an adjacent movable section of the body When the adjacent movable section is depressed it will result in a deformation of the adjacent areas. This deformation will cause the anchor wedge to open and release the floss into the release channel. This frees the end of the floss length, which was formerly held fast by the anchor wedge. The floss then slides out of the release channel and through the sliding terminal. With one end of the floss strand free, the flossing device can be removed by pulling the loose end of the floss out laterally from between teeth.

DESCRIPTION

Figure 1:
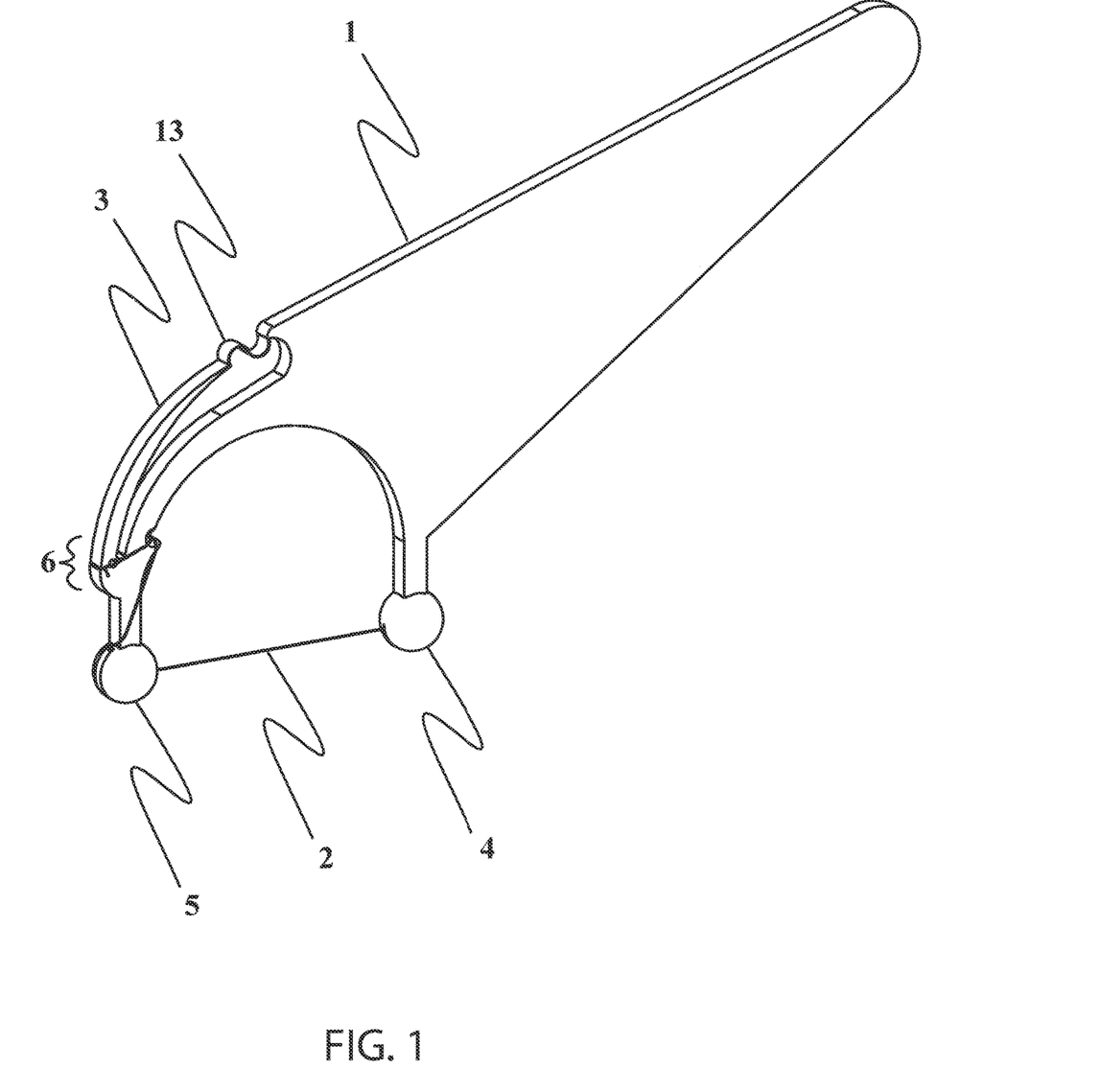
FIG. 1 is a perspective view of an example embodiment of a flosser of the present disclosure.

FIG. 1 shows the invention's body 1 and a length of floss 2. The body 1 is a molded plastic part that includes a fixed anchor terminal 4, a sliding terminal 5, a tie-off 6, and a movable section 3 connected to the body 1. An S-shaped bump 13 allow a user to locate the movable section 3 by feel. The S-shaped bump 13 is a thin-walled feature that enables deformation of the movable section 3.

Figure 4:
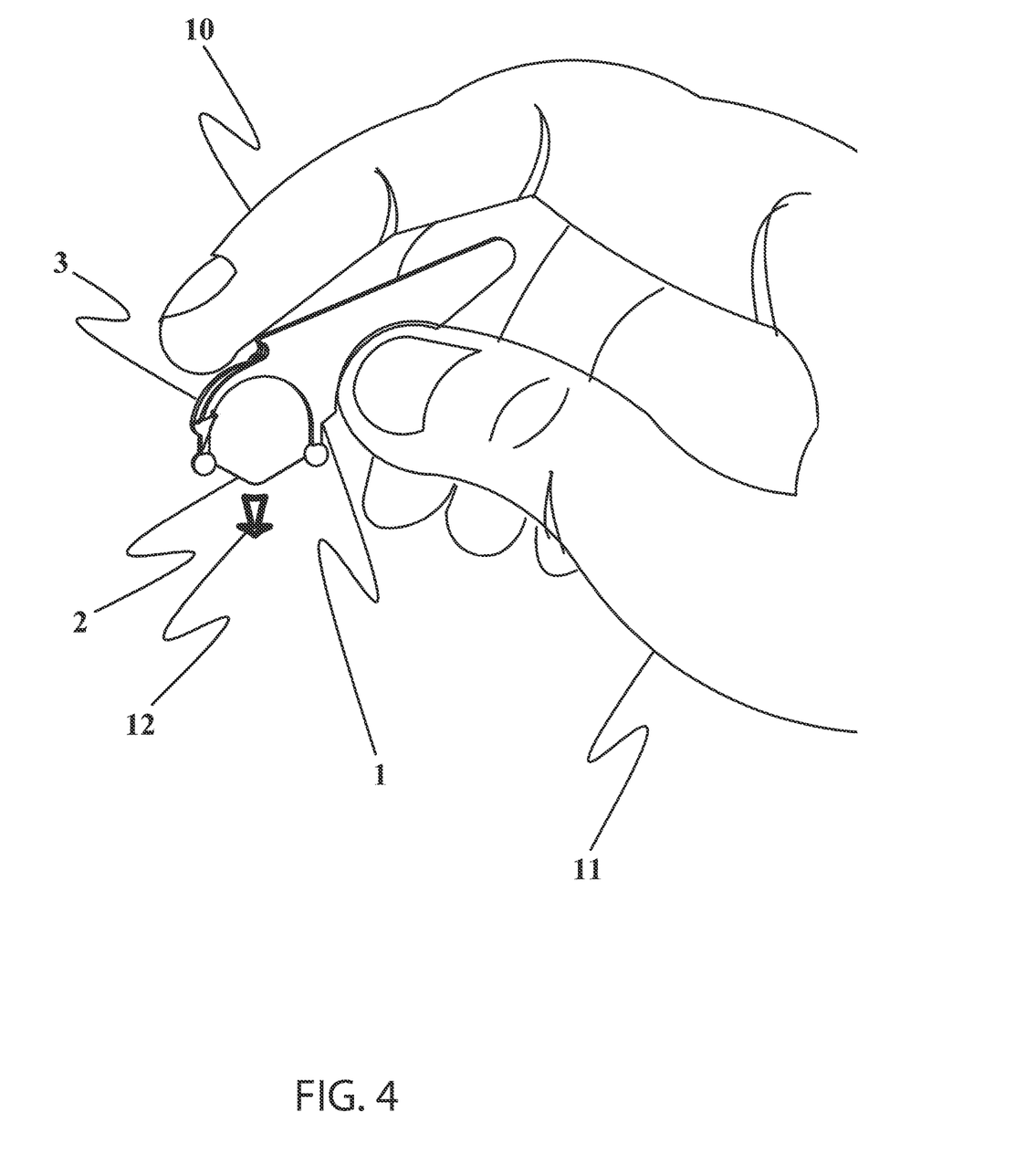
FIG. 4 is a perspective view of the example embodiment shown in a hand with a quick-release feature activated.

The length of floss 2 is attached to an anchor terminal 4, then passed through an opening in the floss sliding channel 5, then secured to the body 1 in the tie-off area 6 (FIG. 4). The region between the anchor terminal 4 and the floss sliding terminal 5 forms a flossing region which is common in the art.

Figure 2:
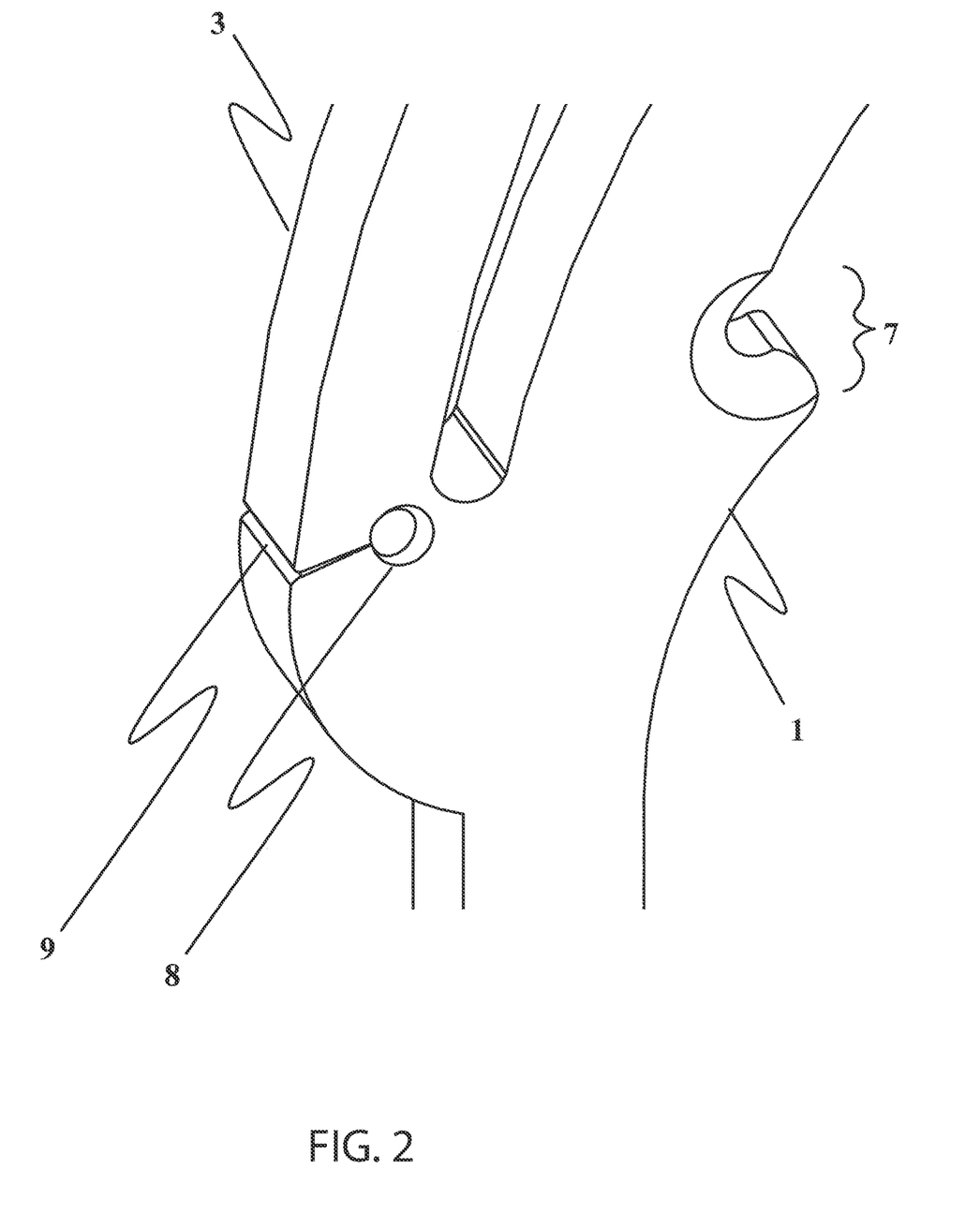
FIG. 2 is a perspective view of the tie-off region of the embodiment shown without the floss in place.

FIG. 2 illustrates the tie-off area 6, shown without the floss. The tie-off area 6 includes a wrapping channel 7, a release channel 8 and an anchor wedge 9.

The wrapping channel 7 and the release channel 8 are formed with smooth edges and surfaces so that the floss 2 encounters little friction. The anchor wedge 9 has locking ridges 14 and an open bottom that connects to the release channel 8.

Figure 3:
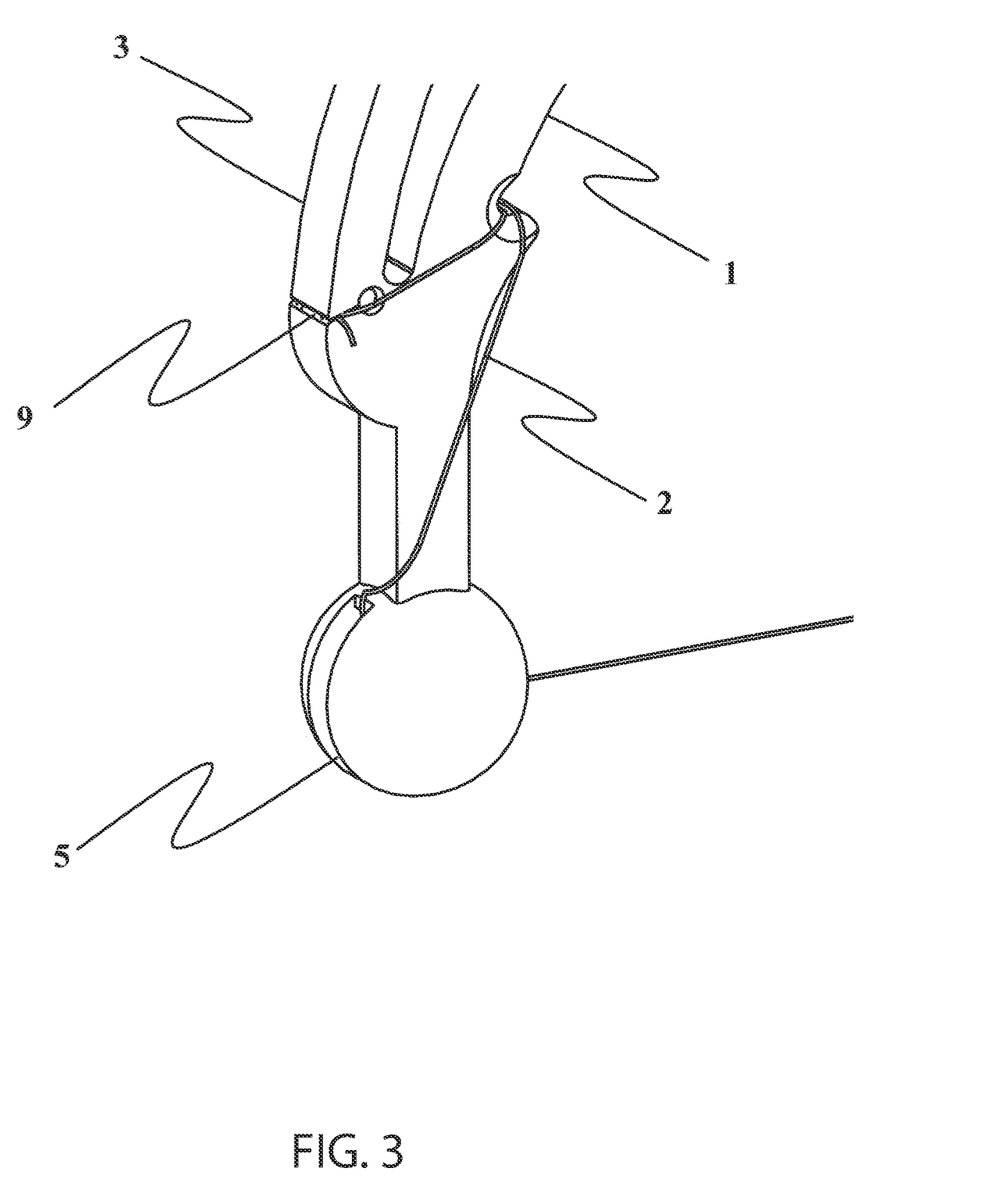
FIG. 3 is a perspective view of the tie-off region, shown with the floss in place.

FIG. 3 shows the tie-off area 6 with the floss 2 in place and secured in the anchor wedge 9. The figure illustrates the floss 2 routed from the floss-sliding channel 5 to the wrapping channel 7 and then around the back side of the body 1, passing through the anchor wedge 9 and then around the front side of the body 1, passing through the wrapping channel 7 again, and again behind the body 1 to end in the anchor wedge 9. The loose end of the floss 2 is positioned at the bottom of the stack in the anchor wedge 9 as is typical for this type of anchoring. One skilled in the art understands that some types of floss may require additional turns around the body 1 to secure the floss 2. It is also possible to reduce the number of required turns around the body by applying a bounding agent in the anchor wedge 9. The embodiment allows the floss to be segmented by regions wherein the flossing region can have one type of treatment (for example wax or a cleaning agent) and the tie off region may be untreated or treated with a friction agent.

In FIG. 4 the release is activated by an index finger 10. With the index finger 10 pressing on the movable section 3, portions of the body 1 are deformed. In addition to depressing the movable section 3, the body 1 must be pushed or pulled to apply stress to the floss 2. The direction arrow 12 shows one example direction in which stress can be applied to the floss 2 by moving the body 1. One skilled in the art understands that various directions may cause the floss to release. Depressing the movable section 3 sufficiently to open the anchor wedge 9 (FIG. 2) releases the floss 2 from the anchor wedge 9 (FIG. 2), enabling the floss to be pulled from the teeth.

Figure 5:
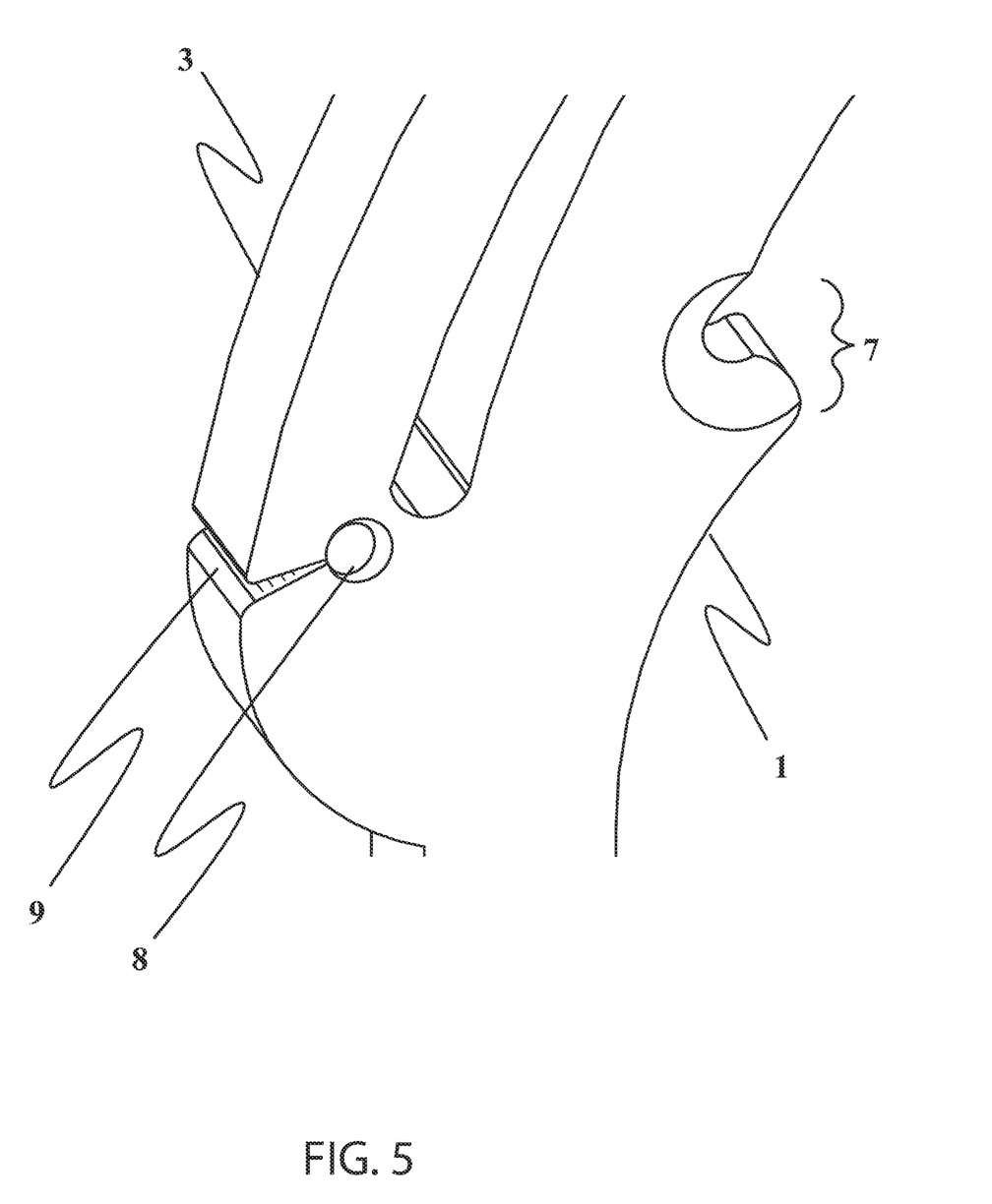
FIG. 5 is a perspective view of the tie-off region, shown without the floss in place and with the release feature activated.

In FIG. 5 the tie-off region 6 is shown with the movable section 3 depressed. (The floss is not shown.) The movable section 3 is depressed enough to open the anchor wedge 9.

Figure 6:
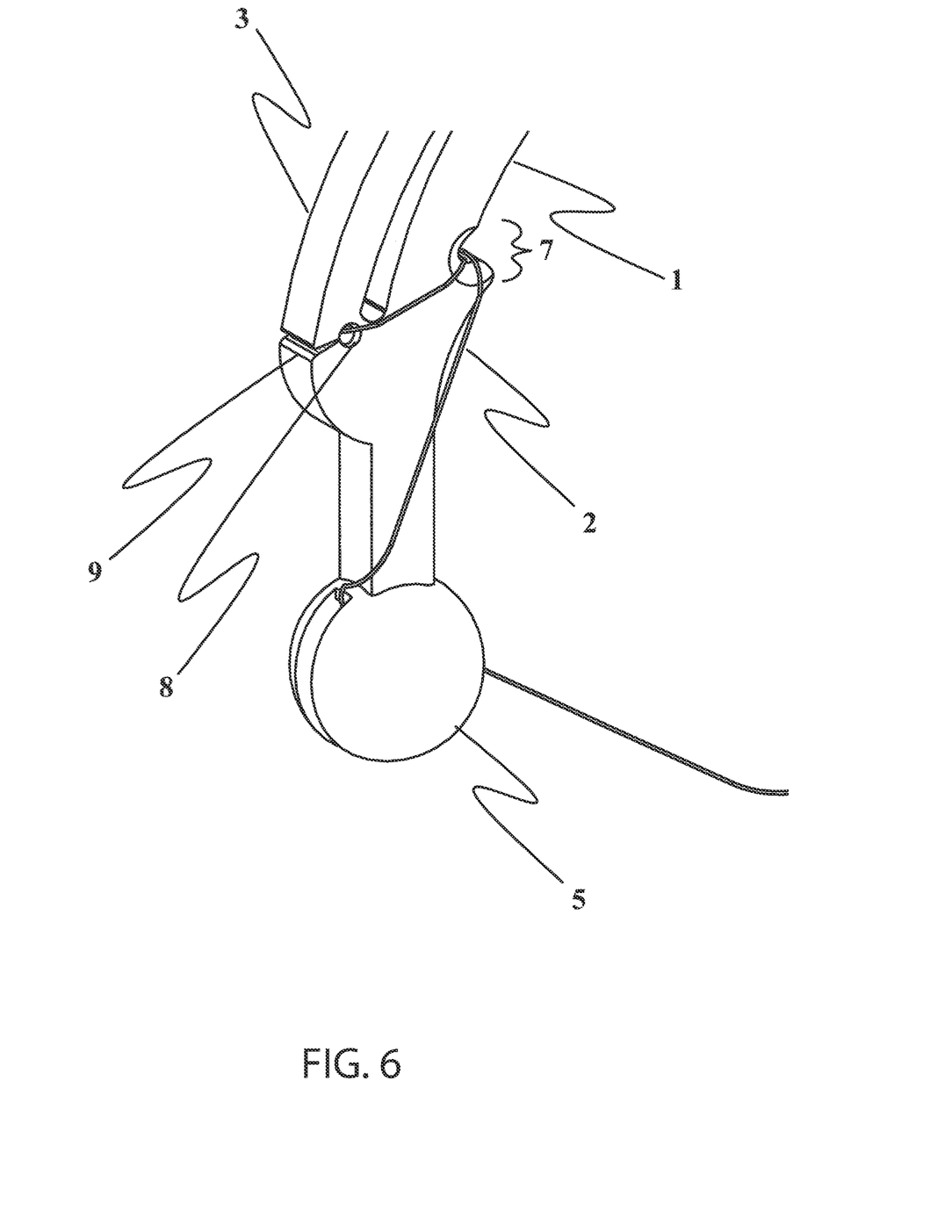
FIG. 6 is a perspective view of the tie-off region, shown with the floss in place and with the release feature activated.

In FIG. 6, the tie-off region 6 is shown in the first stage of the floss-release process. In this first stage the movable section 3 is depressed to cause the anchor wedge 9 to open. With tension applied to the floss 2, the floss 2 is pulled through the open bottom of the anchor wedge 9 into the release channel 8. With continued tension applied, the floss 2 slides through the release channel 8, wrapping channel 7, and the sliding terminal 5 until one end of the floss is freed.

Figure 7:
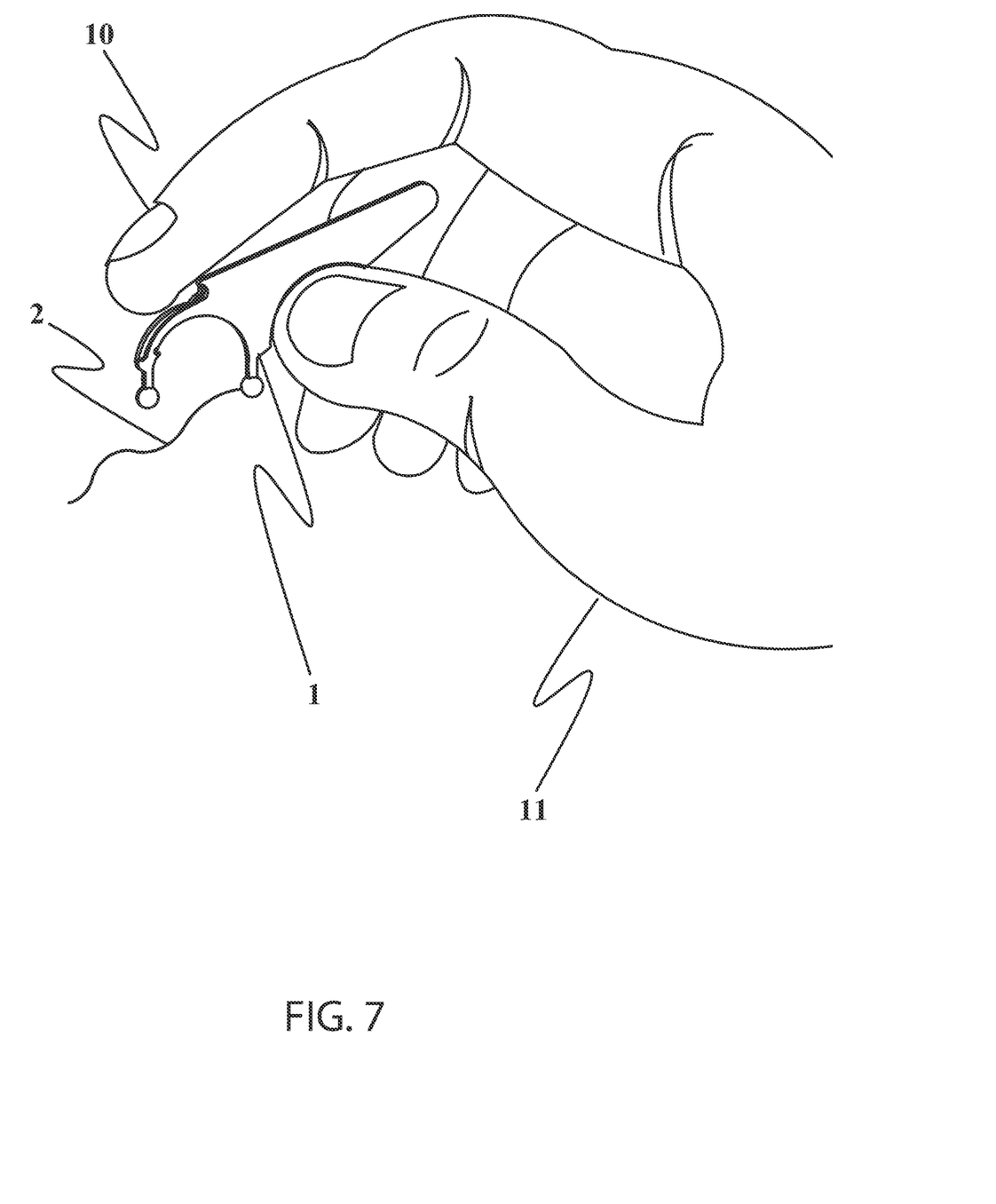
FIG. 7 is a perspective view, shown in a hand, with one end of the floss released.

In FIG. 7 one end of the floss 2 is released to be pulled from between the teeth.

Figure 8:
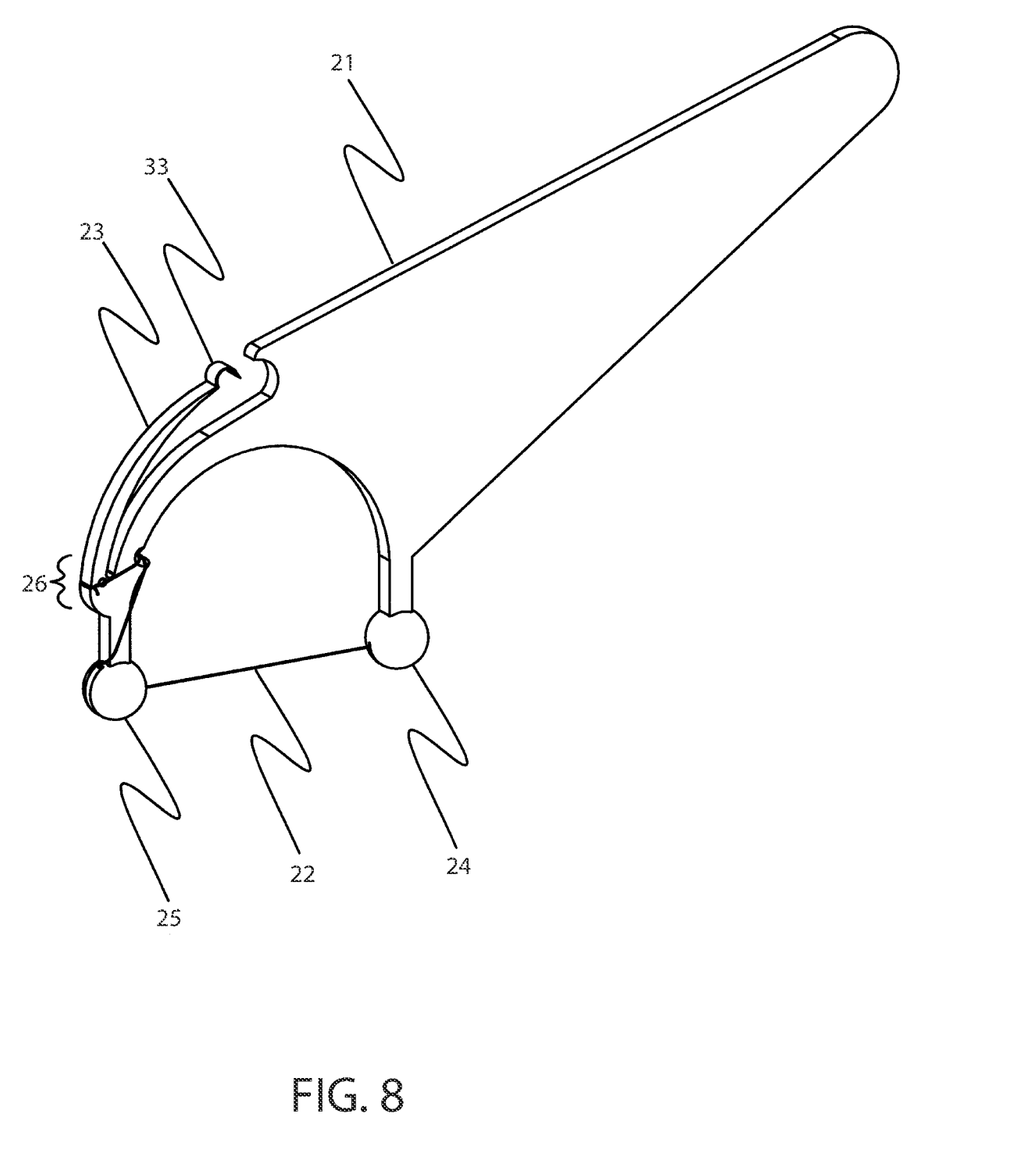
FIG. 8 is a perspective view of an iteration of the embodiment.

FIG. 8 shows an iteration of the embodiment depicting a body 21 and a length of floss 22. The body 21 is a molded plastic part that includes a fixed anchor terminal 24, a sliding terminal 25, a tie-off 26, and a movable section 23 connected to the body 21. A C-shaped bump 33 allow a user to locate the movable section 23 by feel.

These embodiments are intended to define but not limit the invention.

The invention claimed is:

1. A flossing apparatus comprising:
   a body having an anchor terminal, a sliding terminal, and a tie-off; and
   a movable section flexibly engaged with said body proximal to said tie-off; and
   a length of floss fixedly engaged with said anchor terminal following through and slidably engaged with said sliding terminal and removably engaged with said tie-off; and
   an anchor wedge formed by said movable section and said body, and
   a wrapping channel formed in said body; and
   a release channel proximal to said anchor wedge; wherein said length of floss is wrapped around said wrapping channel and clamped in said anchor wedge flexing said movable section and applying stress to the floss releases said floss from said tie-off, allowing said floss to move through said anchor wedge, wrapping channel and sliding terminal providing an end of said length of floss attached to nothing, for easy removal from between teeth.

2. The apparatus of claim 1 wherein said movable section includes a protrusion; wherein the user may feel the protrusion to locate the movable section by feel.

3. The apparatus of claim 2 wherein said protrusion is an S-shaped bump co-molded with said body; wherein a user can find the protrusion by feel.

* * * * *